United States Patent
Noah

(10) Patent No.: US 8,662,241 B2
(45) Date of Patent: Mar. 4, 2014

(54) APPARATUS FOR USE IN TURNING STEERABLE VEHICLE WHEELS

(75) Inventor: Bruce C. Noah, West Lafayette, IN (US)

(73) Assignee: TRW Automotive U.S. LLC, Livonia, MI (US)

(*) Notice: Subject to any disclaimer, the term of this patent is extended or adjusted under 35 U.S.C. 154(b) by 138 days.

(21) Appl. No.: 13/241,342

(22) Filed: Sep. 23, 2011

(65) Prior Publication Data

US 2013/0075188 A1 Mar. 28, 2013

(51) Int. Cl.
*B62D 5/06* (2006.01)

(52) U.S. Cl.
USPC .......................... 180/421; 180/423; 180/441

(58) Field of Classification Search
USPC ......... 180/421, 422, 423, 428, 441, 442, 403, 180/405; 701/41
See application file for complete search history.

(56) References Cited

U.S. PATENT DOCUMENTS

| 5,257,670 A | 11/1993 | Miller et al. | |
|---|---|---|---|
| 7,364,004 B2 * | 4/2008 | Williams | 180/423 |
| 8,403,103 B1 * | 3/2013 | Williams | 180/421 |

* cited by examiner

*Primary Examiner* — Tony Winner
*Assistant Examiner* — Jacob Knutson
(74) *Attorney, Agent, or Firm* — Tarolli, Sundheim, Covell & Tummino LLP

(57) ABSTRACT

An apparatus (10) for use in turning steerable vehicle wheels (14, 16) includes a hydraulic power steering motor (12). A pump (26) is connected in fluid communication with the hydraulic power steering motor (12) by a supply conduit (30). A continuously variable transmission (50) is connected with the engine (52) of the vehicle and with the pump (26). The continuously variable transmission (50) is operable under the influence of force transmitted from the engine (52) to drive the pump at a first speed when the flow of fluid from the pump (26) is at a first level. The continuously variable transmission (50) drives the pump (26) at a second speed different than the first speed when the flow of fluid from the pump is at a second level different than the first level.

14 Claims, 1 Drawing Sheet

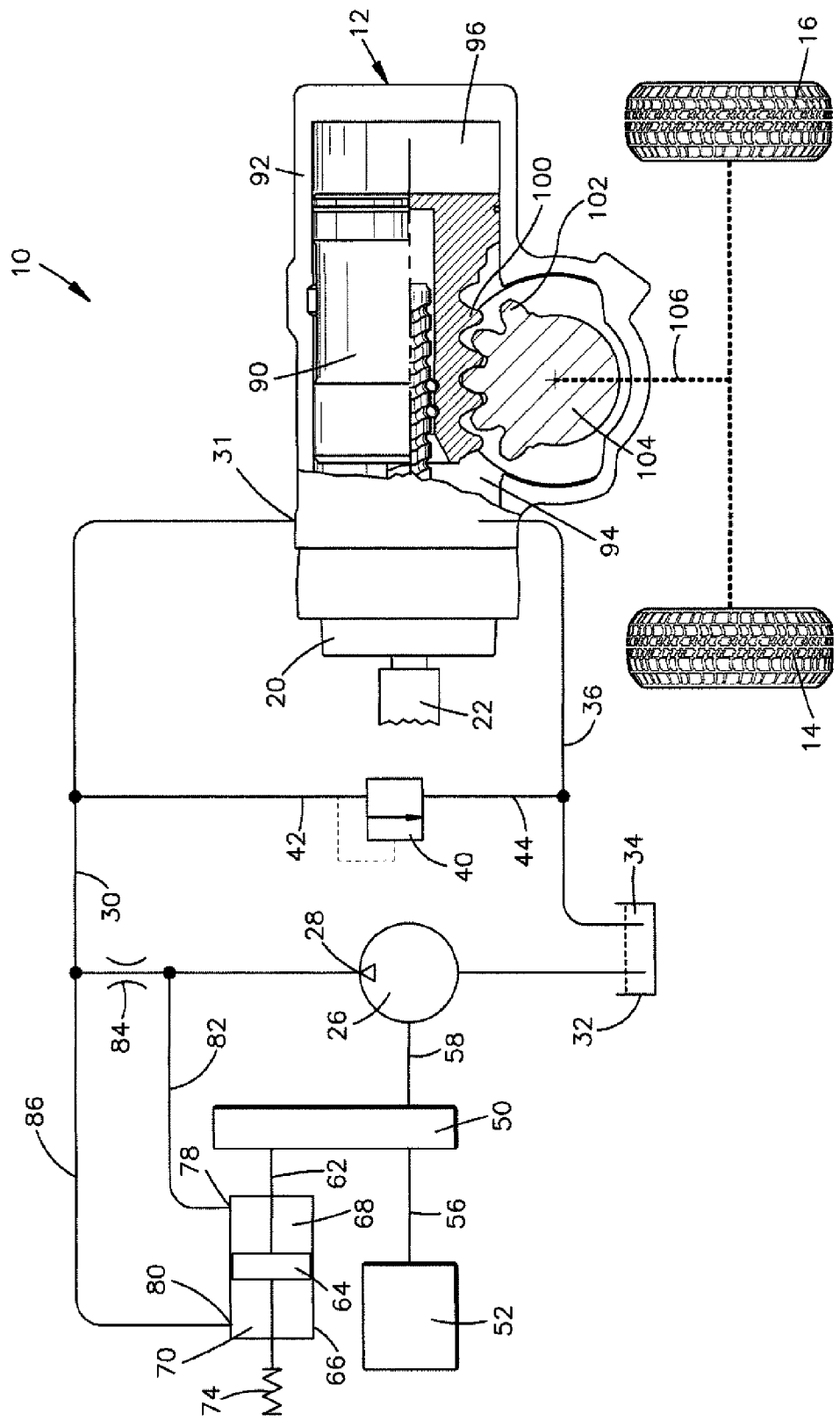

APPARATUS FOR USE IN TURNING STEERABLE VEHICLE WHEELS

BACKGROUND OF THE INVENTION

The present invention relates to an apparatus for use in turning steerable vehicle wheels during operation of a vehicle.

A known apparatus for use in turning steerable vehicle wheels includes a power steering pump. The power steering pump delivers a specific volume of flow per input shaft revolution. The power steering pump is typically sized to provide maximum rated flow required to dry park a vehicle at engine idle. At highway speeds the engine can operate at two or three times its idle speed. Therefore, the fixed displacement power steering pump may provide excess flow and excess pressure at highway speeds.

Excess flow from the power steering pump is diverted away from a hydraulic steering gear by a flow control valve. Therefore, only the rated flow is received by the hydraulic steering gear. Power consumed by this known system is determined by total flow delivered by the pump as a function of engine speed and the pressure drop of the steering system. One known power steering system having this general construction is disclosed in U.S. Pat. No. 5,184,693.

SUMMARY OF THE INVENTION

The present invention relates to an apparatus for use in turning steerable vehicle wheels that includes a hydraulic power steering motor operable to turn the steerable vehicle wheels. A pump is connected in fluid communication with the hydraulic power steering motor by a supply conduit. A continuously variable transmission is connected with the engine of the vehicle and with the pump. The continuously variable transmission is operable under the influence of force transmitted from the engine of the vehicle to drive the pump at a first speed when the flow of fluid from the pump is at a first level. The continuously variable transmission is operable under the influence of force transmitted from the engine to drive the pump at a second speed different than the first speed when the flow of fluid from the pump is at a second level different than the first level. The first speed at which the pump is driven by the continuously variable transmission is greater than the second speed at which the pump is driven by the continuously variable transmission.

In another aspect of the present invention, a vehicle steering system includes a hydraulic power steering gear including a hydraulic motor operatively connectable with steerable vehicle wheels for, when connected with the vehicle wheels, steering the vehicle wheels and a hydraulic fluid reservoir. A fixed displacement pump has an inlet port for fluid communication with the reservoir and an outlet port for fluid communication with the steering gear through a supply conduit. A continuously variable transmission drives the fixed displacement pump. The continuously variable transmission includes a first input driven by the vehicle engine and a second input controlled by a pressure differential across a fixed orifice in the supply conduit. The first and second inputs cause the fixed displacement pump to be driven at a speed to produce a desired hydraulic fluid flow for steering the vehicle wheels.

BRIEF DESCRIPTION OF THE DRAWINGS

The foregoing and other features of the present invention will become apparent to those skilled in the art to which the present invention relates upon reading the following description with reference to the accompanying drawings, in which:

FIG. 1 is a schematic illustration of an apparatus for use in turning steerable vehicle wheels constructed in accordance with the present invention.

DESCRIPTION OF AN EXEMPLARY EMBODIMENT

A vehicle steering apparatus 10 includes a hydraulic power steering motor 12 which is connected with steerable vehicle wheels 14 and 16. A steering control valve 20 is connected with the power steering motor 12. The steering control valve 20 has an input shaft 22 which is connected with a manually rotatable vehicle steering wheel. The steering control valve 20 may be an open center control valve.

A pump 26 has an outlet port 28 connected in fluid communication with the steering control valve 20 and power steering motor 12 by a fluid supply conduit 30. The outlet port 28 of the pump 26 is in fluid communication with an inlet port 31 of the control valve 20. The steering control valve 20 and power steering motor 12 are connected with a reservoir 32 containing hydraulic fluid 34 by a fluid return conduit 36. A pressure relief valve 40 is connected with the fluid supply conduit 30 by a conduit 42 and is connected with the fluid return conduit 36 by a conduit 44.

In accordance with one of the features of the invention, a continuously variable transmission (CVT) 50 is connected with an engine 52 of the vehicle and the pump 26. The CVT 50 is connected with the engine 52 of the vehicle by an input shaft 56 which is rotated at a speed which varies as a direct function of variations in operating speed of the engine 52. The CVT 50 is connected with the pump 26 by an output shaft 58.

The CVT 50 includes a linearly displaceable input member 62. The input member 62 controls the transmission gear ratio of the CVT 50. The input member 62 includes a piston 64 and extends through a housing 66. The housing 66 may be connected with the CVT 50.

The piston 64 partially defines first and second pressure chambers 68 and 70 on opposite sides of the piston in the housing 66. The piston 64 has equal areas against which pressure in the chambers 68 and 70 may act to move the piston relative to the housing 66 and change the transmission gear ratio of the CVT 50. As the input member 62 and piston 64 move relative to the housing 66, the transmission gear ratio of the CVT 50 changes. A spring 74 may urge the input member 62 to a desired initial position against a bias of the CVT 50. The spring 74 may be an adjustable spring. It is also contemplated that the spring 74 may not be included.

The housing 66 for the piston 64 includes first and second fluid inlet ports 78 and 80. The first fluid inlet port 78 is in fluid communication with the first chamber 68 and the second fluid inlet port 80 is in fluid communication with the second chamber 70. The first fluid inlet port 78 is connected with the fluid supply conduit 30 by a conduit 82. The first fluid inlet port 78 is in fluid communication with an upstream side of a fixed orifice 84 in the fluid supply conduit 30. The first fluid inlet port 78 is also in fluid communication with the fluid outlet port 28 of the pump 26. The second fluid inlet port 80 is connected with the fluid supply conduit 30 by a conduit 86. The second fluid inlet port 80 is in fluid communication with the fluid supply conduit 30 on a downstream side of the fixed orifice 84. The second fluid inlet port 80 is also in fluid communication with the inlet port 31 of the control valve 20.

The fixed orifice 84 creates a pressure drop in the fluid supply conduit 30. The input member 62 moves in response to the pressure differential across the fixed orifice 84. The pressure at the fluid outlet port 28 of the pump 26 and on the upstream side of the fixed orifice 84 acts on the piston 64 to urge the piston and the input member 62 in a first direction relative to the housing 66. The pressure at the downstream side of the orifice 84 and at the inlet port 31 of the valve 20 acts on the piston 64 to urge the piston and the input member 62 in a second direction opposite the first direction.

The CVT 50 is operable to drive the pump 26 at a speed which is a function of the pressure drop across the fixed orifice 84. During operation of the vehicle, the differential pressure across the fixed orifice 84 moves the piston 64 and the input member 62 to provide a desired rate of flow of hydraulic fluid from the pump 26 to the steering control valve 20. When the speed of the engine 52 increases, the flow from the pump 26 increases. As the flow from the pump 26 increases, the differential pressure across the fixed orifice 84 increases. The CVT 50 drives the pump 26 at a lower speed when the differential pressure across the fixed orifice 84 increases. When the speed of the engine 52 decreases, the flow from the pump 26 decreases. As the flow from the pump 26 decreases, the differential pressure across the fixed orifice 84 decreases. As the pressure at the inlet port 31 of the valve 20 and, therefore, the downstream side of the fixed orifice 84 increases due to a demand for fluid during a steering operation, the differential pressure across the orifice decreases. When the differential pressure across the orifice 84 decreases, the CVT 50 drives the pump 26 at a higher speed. The differential pressure across the fixed orifice 84 causes the input member 62 to move relative to the housing 66 and the ratio of the CVT 50 changes to vary the speed of the pump 26 to maintain a desired flow. The size of the orifice 84, the areas of the piston 64 acted upon by the pressure differential, and the spring force of the spring 74 are appropriately sized to provide the desired flow.

The CVT 50 may be any continuously variable transmission, such as a NuVinci device manufactured by Fallbrook Technologies. The CVT 50 connects the engine driven input shaft 56 with the output shaft 58 which drives the pump 26. The CVT 50 also has a linearly displaceable input member 62 that is acted upon by the pressure differential across the fixed orifice 84. The pressure differential across the orifice 84 controls operation of the CVT 50 to change the transmission ratio. Accordingly, the pump 26 provides a desired fluid flow during steering operations at any engine speed.

By utilizing the CVT 50, the normal flow control valve which is utilized to divert excess flow of hydraulic fluid from the pump 26 may be eliminated. By using the CVT 50, the pump 26 is driven at the desired speed to produce a desired flow without the use of a flow control valve. Elimination of the flow control valve reduces the energy and heat generated by the vehicle steering apparatus 10.

The power steering motor 12 includes a generally cylindrical piston 90 which divides a housing 92 into left and right variable volume chambers 94 and 96. The piston 90 has rack teeth 100 which meshingly engage teeth 102 disposed on a sector shaft 104. The sector shaft 104 is operatively connected through a vehicle steering linkage 106 to the steerable vehicle wheels 14 and 16.

Upon operation of the steering control valve 20 and response to rotation of the input shaft 22, high pressure fluid from the pump 26 flows into one of the chambers 94 and 96. In addition, fluid flows from the other chamber to the reservoir 32 through the steering control valve 20 and fluid return conduit 36.

The steering control valve 20 has a known construction. The steering control valve 20 may include a core member which is disposed inside of a sleeve member. A torsion bar may act between the core member and the sleeve member. The general construction of the steering control valve 20 and the manner in which it cooperates with the power steering motor 12 is similar to the disclosure in U.S. Pat. No. 5,184, 693.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for use in turning steerable vehicle wheels comprising:

a hydraulic power steering motor connected with the steerable vehicle wheels and operable to turn the steerable vehicle wheels, a pump connected in fluid communication with said hydraulic power steering motor by a supply conduit and operable to supply hydraulic fluid to said hydraulic power steering motor during turning of the steerable vehicle wheels, and a continuously variable transmission connected with an engine of a vehicle and with said pump, said continuously variable transmission being operable under the influence of force transmitted from the engine of the vehicle to drive said pump at a first speed when the flow of fluid from said pump is at a first level, said continuously variable transmission being operable under the influence of force transmitted from the engine to drive said pump at a second speed different than said first speed when the flow of fluid from said pump is at a second level different than the first level, said first speed at which said pump is driven by said continuously variable transmission is greater than said second speed at which said pump is driven by said continuously variable transmission.

2. An apparatus as set forth in claim 1 wherein said continuously variable transmission includes a linearly displaceable input member for changing the speed at which said pump is driven by said continuously variable transmission.

3. An apparatus for use in turning steerable vehicle wheels comprising:

a hydraulic power steering motor connected with the steerable vehicle wheels and operable to turn the steerable vehicle wheels, a pump connected in fluid communication with said hydraulic power steering motor by a supply conduit and operable to supply hydraulic fluid to said hydraulic power steering motor during turning of the steerable vehicle wheels, and a continuously variable transmission connected with an engine of a vehicle and with said pump, said continuously variable transmission being operable under the influence of force transmitted from the engine of the vehicle to drive said pump at a first speed when the flow of fluid from said pump is at a first level, said continuously variable transmission being operable under the influence of force transmitted from the engine to drive said pump at a second speed different than said first speed when the flow of fluid from said pump is at a second level different than the first level, said first speed at which said pump is driven by said continuously variable transmission is greater than said second speed at which said pump is driven by said continuously variable transmission, said continuously variable transmission including a linearly displaceable input member for changing the speed at which said pump is driven by said continuously variable transmission, and wherein a first pressure on a first side of a fixed orifice in said supply conduit acts against a first side of a piston and a second pressure on a second side of said fixed orifice acts against a second side of said piston, said piston being operable to move said linearly displaceable input member of said continuously variable transmission.

4. An apparatus as set forth in claim 3 wherein a spring urges said piston into an initial position.

5. An apparatus as set forth in claim 3 wherein movement of said piston relative to a housing is transferred to said linearly displaceable input member of said continuously variable transmission.

6. An apparatus for use in turning steerable vehicle wheels comprising:
a hydraulic power steering motor connected with the steerable vehicle wheels and operable to turn the steerable vehicle wheels,
a pump connected in fluid communication with said hydraulic power steering motor by a supply conduit and operable to supply hydraulic fluid to said hydraulic power steering motor during turning of the steerable vehicle wheels, and
a continuously variable transmission connected with an engine of a vehicle and with said pump, said continuously variable transmission being operable under the influence of force transmitted from the engine of the vehicle to drive said pump at a first speed when the flow of fluid from said pump is at a first level, said continuously variable transmission being operable under the influence of force transmitted from the engine to drive said pump at a second speed different than said first speed when the flow of fluid from said pump is at a second level different than the first level, said first speed at which said pump is driven by said continuously variable transmission is greater than said second speed at which said pump is driven by said continuously variable transmission,
wherein said continuously variable transmission has an output member connected with said pump, a first input member connected with the engine of the vehicle, and a second input member movable in response to a differential pressure across a the fixed orifice in said supply conduit.

7. An apparatus as set forth in claim 6 further including a piston connected with said second input of said continuously variable transmission, said piston being movable relative to a housing, a first pressure on a first side of said fixed orifice acting against a first side of said piston and a second pressure on a second side of said fixed orifice acting against a second side of said piston, a differential pressure of said first and second pressures being operable to effect movement of said piston relative to said housing.

8. A vehicle steering system comprising:
a hydraulic power steering gear including a hydraulic motor operatively connectable with steerable vehicle wheels for, when connected with the vehicle wheels, steering the vehicle wheels,
a hydraulic fluid reservoir,
a fixed displacement pump having an inlet port for fluid communication with said reservoir and an outlet port for fluid communication with said steering gear through a supply conduit,
a continuously variable transmission for driving said fixed displacement pump, said continuously variable transmission including a first input driven by a vehicle engine and a second input controlled by a pressure differential across a fixed orifice in said supply conduit, said first and second inputs causing said fixed displacement pump to be driven at a speed to produce a desired hydraulic fluid flow for steering the vehicle wheels.

9. An apparatus as set forth in claim 8 wherein said second input is a linearly displaceable member for changing the transmission ratio of said continuously variable transmission to change the speed at which said pump is driven by said continuously variable transmission.

10. An apparatus as set forth in claim 9 wherein a pressure at an upstream side of said fixed orifice acts against a first side of a piston, a pressure at a downstream side of said fixed orifice acts against a second side of said piston, said piston being connected to said linearly displaceable member of said continuously variable transmission.

11. An apparatus as set forth in claim 10 wherein a spring urges said linearly displaceable member to an initial position.

12. An apparatus as set forth in claim 10 wherein said piston is movable relative to a housing, said housing defining a first chamber in fluid communication with said upstream side of said fixed orifice, said housing defining a second chamber in fluid communication with said downstream side of said fixed orifice, the pressures in said first and second chambers being operable to effect movement of said piston relative to said housing.

13. An apparatus as set forth in claim 12 wherein said first and second sides of said piston have the same area.

14. An apparatus as set forth in claim 6 further including a piston connected with said second input of said continuously variable transmission, said piston being movable relative to a housing, said housing having a fluid inlet connected with said outlet port of said pump, the pressure at said outlet port of said pump being operable to effect movement of said piston relative to said housing.

* * * * *